United States Patent [19]

Ihm et al.

[11] Patent Number: 5,369,133
[45] Date of Patent: Nov. 29, 1994

[54] METHOD FOR PREPARING AN IMPROVED POROUS POLYMER BEAD

[75] Inventors: Son-Ki Ihm, Seoul; Young-Do Jo, Miryang, both of Rep. of Korea

[73] Assignee: Korea Advanced Institute of Science and Technology, Taejon-City, Rep. of Korea

[21] Appl. No.: 998,447

[22] Filed: Dec. 29, 1992

[30] Foreign Application Priority Data

Sep. 26, 1992 [KR] Rep. of Korea .................... 92-17617

[51] Int. Cl.$^5$ .............................................. C08J 9/28
[52] U.S. Cl. ...................................... 521/53; 521/54; 521/56; 521/134; 521/146
[58] Field of Search ...................... 521/54, 53, 56, 146, 521/134

[56] References Cited

U.S. PATENT DOCUMENTS 4,908,392  3/1990  Kusano et al. ...................... 521/56

*Primary Examiner*—Morton Foelak
*Attorney, Agent, or Firm*—Birch, Stewart, Kolasch & Birch

[57] ABSTRACT

A method for preparing an improved porous polymer bead which comprises the following steps: introducing a mixture comprising a purified monomer, initiator and pore-forming agent into a 4-necked reactor with a suspension stabilizer and aqueous solution, suspending the mixture to provide homogeneous organic droplets at a temperature sufficiently low so as not to decompose the initiator, increasing the temperature gradually to a final reaction temperature and maintaining the temperature at the final temperature to react completely by suspension-polymerization the monomers in the individual organic droplet to provide the porous polymer bead, separating the bead, washing the bead with water, acetone and tetrahydrofuran, successively, and drying the bead, precipitating the bead in a solution mixed with monomer nd thinner to fill the pores of the porous bead with the diluted monomers, and introducing in a 4-necked reactor with a suspension stabilizer and aqueous solution, and by suspension-polymerization again, to coat the lightly cross-linked gel-type polymer on the surface of pores in the porous polymer bead, and again washing and drying the beads to provide an improved porous polymer bead.

6 Claims, 1 Drawing Sheet

METHOD FOR PREPARING AN IMPROVED POROUS POLYMER BEAD

BACKGROUND OF THE INVENTION

1. Field of the Invention

The present invention relates to a method for preparing an improved porous polymer bead. More particularly, it relates to a method for preparing an improved porous polymer bead, which can introduce a number of functional groups per unit mass, has a high reaction rate and yield in the functionalization and application reaction, has stability under shock and constant high pressure, and has a low diffusional limitation on reaction rates.

2. Description of the Prior Art

Polymer bead is a polymer that serves as a support for some components of a reaction system, that is, it contains an appropriate functional group that can be bound to chemical groups to function as a reagent, catalyst and protecting function, etc. Such a polymer bead are widely used in chemistry, which include, for example, a polymeric reagent, ion-exchange resin, polymer supported phase transfer catalyst and polymer supported transition metal complex. The polymer supports may be linear polymers forming the molecular solution in a good solvent, and crosslinked polymers, i.e., beads insoluble macroscopically but swelling in a good solvent. A polymer bead is widely used as a polymer support because of a number of advantages from the insolubility thereof. Namely, when expensive catalytic active sites were supported on the polymer bead. Recovery and regeneration of expensive catalysts are facilitated, since the polymeric catalysts can be simply separated from the reaction mixture by filtration.

Somewhat, chemical functionalization of the polymer bead and continuous use as a polymeric catalyst after functionalizing, is determined by physical characteristics of the polymer bead. Accessibility of the reactants to the functional groups of the polymer supported catalyst depends on the swelling of polymer size and volume of the pore-resin specific catalytic reaction. These properties are determined by the degree of crosslinking of the polymer bead and synthetic condition for preparation. Polymeric beads may be generally classified into gel-type and macroreticular type according to its morphology.

Gel-type bead may be prepared by direct suspension-polymerization of the monomer with a vinyl group and crosslinking agent with two vinyl groups in the absence of a solvent. However, the polymer matrices open up, as good solvents are absorbed into it. Soft gel network was formed, upon contacting, with the good solvent. Thus the formed gelullar polymer bead has a considerable solvent volume. The gel-type polymer bead which contains crosslinking agent of less than 1% has high swelling in a good solvent but deteriorates easily because it possesses a low mechanical strength in general. While the gel-type polymer bead having the degree of crosslinking, more than 8% has a high degree of mechanical stability but the reactant is difficult to access to the functional groups in polymer bead by permeation due to the low swelling. Namely, when the polymer bead have a high degree of crosslinking, the reaction rate in the polymer is slow. Gel-type polymer bead with a 2% degree of crosslinking is widely used to provide an appropriate diffusion rate for the reactant and the sufficient mechanical strength, and is to be treated with ease.

There is, for example, a copolymer bead prepared by suspension-polymerization of 98% styrene and 2% divinylbenzene.

A method for preparation of a porous polymer bead is similar to that of a gel-type resin except for the addition of the pore-forming agent. In the case that the monomers and polymers are dissolved completely in a pore-forming agent, a highly swelling network is formed after suspension-polymerization. When such a swollen polymer is dried in a vacuum oven to remove the solvent, a part of polymer is deteriorated, but many macropores were formed. The degree of crosslinking must be about 20% to have a suitable mechanical strength of pores. Macroreticular-type bead also prepared by polymerization using the pore-forming agent to act not only as a good solvent for the monomer, but also as a precipitator for the produced polymer. The macroreticular-type polymer bead obtained by the later method maintaining a whole shape and pore volume at removing the pore-forming agent and the size of the pore of the resin is larger than when using a good solvent for the polymer as pore-forming agent. This bead has a high content of crosslinking agent and large permanent pore volume, so that the reactant is facilitated to access to the reactive functional group. Such gel-type and porous bead are selected according to use, difference of application in catalyst, organic synthesis, separation of mixture, are as follows. Gel-type polymer bead must be swollen by a suitable solvent so that the reactant may diffuse into resin. But, gel-type resin is widely used because it has a high reactivity and yield per unit volume in functionalization and application reaction, and possesses high loading capacity under a good solvent. The swollen gel-type polymer bead is not sensitive to sudden shock while it was deteriorated easily under the constant high pressure. Also, there is a problem that when it is applied to packed column reactor because of the change of volume due to swelling in a good solvent. Meanwhile, a porous polymer bead having a strong macropore possesses low loading-capacity, low diffusional limitation as compared with a gel-type bead a small change of volume in the solvent. It has a stability under the constant high pressure, while it was deteriorated easily under sudden shock.

Under these conditions, the present inventors have made extensive studies to provide an improved porous polymer bead which may obviate and mitigate the above-mentioned drawbacks. As a result thereof, the present inventors found an improved porous polymer bead having the advantages of gel-type and porous bead to complete the present invention.

SUMMARY OF THE INVENTION

Thus, an object of the present invention is to provide a method for preparing an improved porous polymer bead, which can introduce a large number of functional groups per mass, has high reactivity, yield in the functionalization and application reaction, has a stability under shock and constant high pressure, and is of a low diffusional limitation on reaction rates. To accomplish the object of the present invention, a method for preparing an improved porous polymer bead according to the present invention comprises the following steps: introducing a mixture comprising a purified monomer, initiator and pore-forming agent into a 4-necked reactor with suspension stabilizer and aqueous solution, suspending the mixture to provide homogeneous droplets at a temperature sufficiently low so as not to decompose the initiator, increasing the temperature gradually to a final reaction temperature and maintaining the temperature at the final temperature to react completely the monomers in the individual organic droplet to provide the porous polymer bead. The bead was separated, washed with water, acetone and tetrahydrofuran, successively, and dried. The bead was precipitated in a solution mixed with monomer and thinner under vacuum to fill the pores of the porous bead with the diluted monomers, and introduced in the 4-necked reactor with a suspension stabilizer and aqueous solution, and by suspension-polymerization again, to coat the lightly crosslinked gel-type polymer on the surface of pores in the porous polymer bead. The bead was again washed and dried as mentioned above to give an improved porous polymer bead.

DETAILED DESCRIPTION OF THE INVENTION

Figure 1:
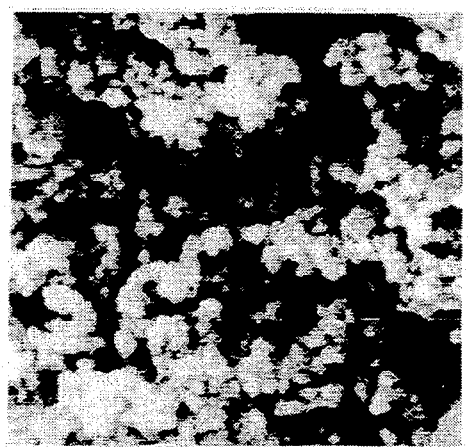
FIG. 1 shows a cross-sectional view of a porous polymer bead.

Suspension polymerization was carried out in order to prepare macroporous polymer bead in a 4-necked reactor equipped with a mechanical stirrer, a condenser, a nitrogen inlet, and reactant inlet. The suspension stabilizer and water were introduced into reactor. The mixture of a purified monomer, initiator and pore-forming agent was suspended in water and carried out by suspension polymerization. The stirrer has two blades. The upper blade is located in interphase between the organic layer and the aqueous layer, and the lower blade is located in the aqueous solution to maximize the vertical motion in the reactor fluid. The suspension-stabilizer includes, for example, polyvinyl alcohol, polydiallyl dimethyl ammonium chloride, gelatine, boric acid, calcium phosphate and sodium dodecylbenesulfonate. The suspension-polymerization is carried out with stirring at a temperature sufficiently low as not to decompose the initiator for a few minutes to stabilize the spherical organic droplets. The temperature is then raised gradually to the final reaction temperature and maintained to react the monomers completely to give the porous polymer bead. At this stage, the size of pore and surface area can be controlled by the amount and nature of pore-forming agent, and the particle size can be controlled by the stirring speed and the nature or amount of the suspension-stabilizer. The porous polymer bead prepared above is separated, washed several times with water, acetone and tetrahydrofuran to remove the suspension-stabilizer and reactants, dried in air and dried absolutely in a vacuum oven at 100° C. The bead is precipitated in a solution of monomer and thinner to fill the pore of the porous bead with the diluted monomer and introduced in a 4-necked reactor with stabilizer. Suspension-polymerization is carried out again to give the improved porous polymer bead coated with lightly crosslinked gel-type polymer on the pore surface of the porous polymer bead washed and dried by the same procedure as mentioned above.

This invention will be described in detail below with reference to the accompanying examples, but not limited thereto.

EXAMPLE 1

Styrene 12.6 ml, commercial divinylbenzene 37.4 ml, heptane 50 ml and AIBN(azobisiobutryonotrile) 0.6 g were mixed to give an organic solution. An aqueous solution of polyallyl dimethyl ammonium chloride and water was prepared. Then, the above aqueous and organic solutions were introduced in a 4-necked reactor and suspended for 30 min at 40° C. to obtain homogeneous organic droplets. The suspension was warmed to 90° C. gradually by 0.5° C. per minute and maintained for 15 hours at the temperature to react the monomers completely. The porous polymer bead prepared above was separated, washed two or three times with water, acetone and tetrahydrofuran, successively, to remove the suspension-stabilizer and unreacted reactants included in the polymer bead, and dried in air and in a vacuum oven at 100° C. Then, the porous polymer bead prepared above was immersed into a mixed solution of monomer and thinner to fill the pores with the diluted monomers. The bead was introduced in a 4-necked reactor with aqueous solution and suspension stabilizer, and again carried out by suspension polymerization to give the improved porous polymer bead, which was washed and dried in the manner mentioned above.

Figure 2:
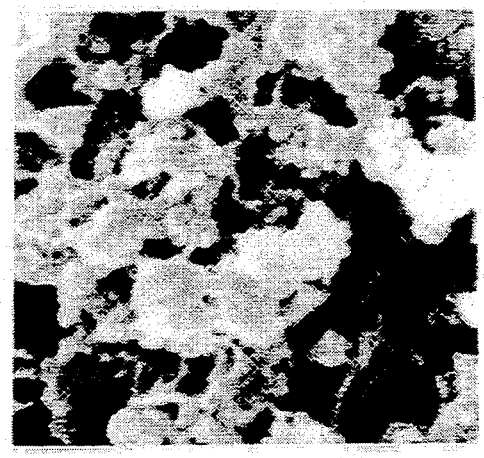
FIG. 2 shows a cross-sectional view of an improved porous polymer bead according to the present invention.

The cross-sectional view of the porous resin is represented in FIG. 1. The porous resin 20 g prepared above was immersed under vacuum in 20 ml of mixed organic solution of monomer comprising styrene 4.8 ml and commercial divinylbenzene 0.2 ml, AIBN 0.6 g, and toluene 15 ml where the composition of monomer is the same as a gel-type polymer bead. The immersed porous polymer bead was carried out by suspension-polymerization to produce an improved porous polymer bead. The cross-sectional view of the improved porous polymer bead is shown in FIG. 2.

Experimental Example 1

In order to examine the characteristics of an improved porous polymer bead is polymer-supported catalyst, the following experiment was carried out. Above-mentioned porous polystyrene resin 20 g were immersed in a mixture of monomer 5 ml consisting of chloromethylstyrene 31.6%, commercial divinylbenzene 4% and styrene 64.6% and 15 ml of toluene, and suspension-polymerized to give an improved porous polymer bead containing functional groups. The bead was carried out by phosphination with lithium diphenyl phosphine (LiPPh$_2$), and supported on palladium dichloride to obtain an improved porous polymer supported catalyst.

In a mixed solution of chloromethylstyrene 14.1 ml, commercial benzene 35.9 ml and heptane 50 ml was carried out by suspension-polymerization to give a porous polymer bead with functional groups and carried out by phosphination and supported on palladium dichloride to obtain a porous polymer supported catalyst as comparison.

In a methanol solution of two-type catalysts a hydrogenation of cyclohexene was carried out at 30° C. As a result thereof, an activity of an improved porous polymer supported catalyst is three times as that of the porous polymer supported catalyst. The porous polymer supported catalyst was decomposed by shocking during the reaction. In the meantime, an improved porous polymer supported catalyst maintained an early shape of particle until the reaction was completed.

What is claimed is:

1. A method for preparing an improved porous polymer bead which comprises the following steps: introducing a mixture comprising a purified monomer, initiator and pore-forming agent into a 4-necked reactor with a suspension stabilizer and aqueous solution, suspending the mixture to provide homogeneous organic droplets at a temperature sufficiently low so as not to decompose the initiator, increasing the temperature gradually to a final reaction temperature and maintaining the temperature at the final temperature to react completely by suspension-polymerization, the monomers in the individual organic droplet to provide the porous polymer bead, separating the bead, washing the bead with water, acetone and tetrahydrofuran, successively, and drying the bead, adding the bead to a solution mixed with monomer and thinner to fill the pores of a porous bead with the diluted monomers and introducing in a 4-necked reactor with a suspension stabilizer and aqueous solution, and by suspension-polymerization again, to coat a lightly cross-linked gel-type polymer on the surface of pores in the porous polymer bead, and again washing and drying the beads to provide an improved porous polymer bead.

2. The method of claim 1, wherein the purified monomer is styrene.

3. The method of claim 1 wherein said mixture further comprises divinylbenzene.

4. The method of claim 1, wherein the suspension stabilizer is polyvinyl alcohol, polydiallyl dimethyl ammonium chloride, gelatin, boric acid, calcium phosphate, sodium dodecylbenzenesulfonate or a mixture thereof.

5. The method of claim 1, wherein said pore-forming agent is a pore-forming solvent.

6. The method of claim 1, wherein said pore-forming agent is an organic pore-forming solvent.

* * * * *